US011200588B1

(12) United States Patent
Richardson et al.

(10) Patent No.: US 11,200,588 B1
(45) **Date of Patent: *Dec. 14, 2021**

(54) GAMING SYSTEM FOR RECOMMENDING FINANCIAL PRODUCTS BASED UPON GAMING ACTIVITY

(71) Applicant: Nationwide Mutual Insurance Company, Columbus, OH (US)

(72) Inventors: Lynn Richardson, Newark, OH (US); William T. Weger, Columbus, OH (US); Ripudaman S. Kohli, Naperville, IL (US); Srikar Adusumilli, Columbus, OH (US); Shashank Obulampalli, Dublin, OH (US); Trevor Walsh, Dublin, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,405

(22) Filed: Jan. 17, 2020

Related U.S. Application Data

(63) Continuation of application No. 15/473,736, filed on Mar. 30, 2017, now Pat. No. 10,540,670.

(Continued)

(51) Int. Cl.

| | |
|---|---|
| ***G06Q 30/02*** | (2012.01) |
| ***G06Q 10/10*** | (2012.01) |

(Continued)

(52) U.S. Cl.

CPC ..... *G06Q 30/0209* (2013.01); *G06Q 10/1095* (2013.01); *G06Q 50/01* (2013.01); *G06Q 40/06* (2013.01); *G06Q 40/08* (2013.01)

(58) Field of Classification Search

CPC .... G06Q 30/0277; G06Q 40/08; G06Q 40/06; G06Q 30/0207; G06Q 30/0255;

(Continued)

(56) References Cited

U.S. PATENT DOCUMENTS

| | | |
|---|---|---|
| 5,231,568 A | 7/1993 | Cohen et al. |
| 5,697,844 A | 12/1997 | Von Kohorn |

(Continued)

*Primary Examiner* — Scott L Jarrett

(74) *Attorney, Agent, or Firm* — Morgan, Lewis & Bockius LLP

(57) ABSTRACT

A sales lead generation system includes components including a gaming device and an application server. The application server includes a game controlling module and an education module configured to display on the gaming device educational information regarding financial products and receive data indicating that the end user has reviewed the educational information or answered a question regarding it. The application server also includes a loyalty module configured to award the end user consumer reward points. A social media server component is configured to transmit social media data associated with the end user to the application server. A biofeedback device component is configured to collect biofeedback data associated with the end user and transmit the biofeedback data to the application server. The application server further includes a correlation module configured to identify financial products based on the game play data, the social media data and the biofeedback data. A display and input device is configured to display to the end user data describing the one or more financial products; receive input describing an indication of interest of the end user regarding one or more of the one or more financial products; transmit data describing a location of the end user to the application server. An agent/advisor server is configured to identify a sales entity at the location that sells financial products indicated by the end user to be of interest. A client calendar server is configured to assist in (Continued)

301 Receive game play data
302 Display educational information
303 Receive data indicating review of educational information or answer to question
304 Reward points
305 Receive biofeedback/social media data
306 Identify financial products
307 Display financial product info
308 Receive indication of interest
309 Determine location of end user
310 Identify sales entity
311 Establish communication event scheduling a communication event between the sales entity and the end user.

11 Claims, 3 Drawing Sheets

Related U.S. Application Data

(60) Provisional application No. 62/381,637, filed on Aug. 31, 2016.

(51) Int. Cl.
*G06Q 40/08* (2012.01)
*G06Q 40/06* (2012.01)
*G06Q 50/00* (2012.01)

(58) Field of Classification Search
CPC ............... G06Q 30/0631; G06Q 30/06; G06Q 30/0601; G06Q 30/00; G06Q 30/0251; G06Q 30/0241; G06Q 30/0226; G06Q 30/0209; G06Q 20/387
See application file for complete search history.

(56) References Cited

U.S. PATENT DOCUMENTS 5,743,746 A 4/1998 Ho et al.
5,774,870 A 6/1998 Storey
6,036,601 A 3/2000 Heckel
6,067,525 A 5/2000 Johnson et al.
6,120,300 A 9/2000 Ho et al.
6,196,920 B1 3/2001 Spaur et al.
6,264,560 B1 7/2001 Goldberg et al.
6,267,672 B1 7/2001 Vance
6,267,675 B1 7/2001 Lee
6,616,533 B1 9/2003 Rashkovskiy
6,645,068 B1 * 11/2003 Kelly .................... G06Q 20/04 463/25
6,760,727 B1 * 7/2004 Schroeder ............. G06Q 30/02
6,764,395 B1 7/2004 Guyett
6,850,895 B2 2/2005 Brodersen et al.
6,868,389 B1 3/2005 Wilkins et al.
6,928,414 B1 8/2005 Kim
7,016,870 B1 3/2006 Jones et al.
7,035,699 B1 4/2006 Anderson et al.
7,047,206 B1 5/2006 Schultze
7,054,831 B2 5/2006 Koenig
7,136,906 B2 11/2006 Giacalone, Jr.
7,228,284 B1 6/2007 Vaillancourt et al.
7,340,410 B1 3/2008 Vaillancourt et al.
7,895,076 B2 * 2/2011 Kutaragi .......... H04N 21/26258 705/14.41
7,901,288 B2 3/2011 Barsness et al.
7,954,698 B1 6/2011 Pliha
8,328,640 B2 12/2012 Rom et al.
8,413,181 B2 4/2013 Riedl et al.
8,458,062 B2 * 6/2013 Dutt ...................... G06Q 30/02 705/35
8,606,637 B1 12/2013 Delker et al.
8,799,058 B2 8/2014 Golembiewski
9,129,317 B2 * 9/2015 Dasgupta ........... G06Q 30/0601
9,203,905 B1 12/2015 Hong et al.
9,773,244 B2 * 9/2017 Lotvin .................. G06Q 50/20
2002/0026356 A1 2/2002 Bergh et al.
2002/0059095 A1 5/2002 Cook
2002/0077998 A1 6/2002 Andrews et al.
2002/0082892 A1 6/2002 Raffel et al.
2002/0116266 A1 8/2002 Marshall
2002/0156672 A1 * 10/2002 Burko .................... G06Q 30/04 705/7.16
2002/0188509 A1 12/2002 Ariff et al.
2004/0073488 A1 4/2004 Etuk et al.
2004/0122735 A1 6/2004 Meshkin
2004/0143473 A1 7/2004 Tivey et al.
2004/0143476 A1 7/2004 Kapadia et al.
2004/0148221 A1 7/2004 Chu
2005/0027632 A1 2/2005 Zeitoun et al.
2005/0044036 A1 2/2005 Harrington et al.
2005/0137968 A1 6/2005 Mitchell
2005/0261929 A1 11/2005 Hansen et al.
2005/0261951 A1 11/2005 Tighe
2006/0130095 A1 6/2006 Willis et al.
2006/0224455 A1 10/2006 Willis
2006/0240894 A1 10/2006 Andrews
2007/0066403 A1 3/2007 Conkwright
2007/0072676 A1 3/2007 Baluja
2007/0192171 A1 8/2007 Lotvin et al.
2007/0239721 A1 10/2007 Ullman et al.
2008/0263673 A1 10/2008 Brun et al.
2009/0170608 A1 7/2009 Herrmann et al.
2010/0094774 A1 * 4/2010 Jackowitz ............. G06Q 40/06 705/36 R
2011/0123963 A1 5/2011 Korney
2011/0137730 A1 * 6/2011 McCarney ......... G06Q 30/0203 705/14.58
2011/0213664 A1 9/2011 Osterhout et al.
2011/0221132 A1 9/2011 Kimbrough
2011/0246276 A1 10/2011 Peters et al.
2011/0251021 A1 10/2011 Zavadsky et al.
2012/0123790 A1 5/2012 Kenyon
2012/0215636 A1 8/2012 Ross
2013/0013387 A1 1/2013 Groverman
2013/0072308 A1 3/2013 Peck et al.
2013/0275329 A1 10/2013 Starr
2013/0344968 A1 * 12/2013 Halfteck ................ A61B 5/167 463/43
2014/0073410 A1 3/2014 Ramos et al.
2014/0136443 A1 5/2014 Kinsey, II et al.
2014/0143352 A1 5/2014 Yegnashankaran
2014/0156313 A1 6/2014 Rogers
2014/0156377 A1 6/2014 Eto et al.
2014/0295381 A1 10/2014 Bhaskaramurthy et al.
2014/0309038 A1 10/2014 Patil
2014/0337093 A1 11/2014 Jain
2015/0046247 A1 2/2015 Rajappa
2015/0081520 A1 3/2015 Brereton et al.
2015/0161638 A1 * 6/2015 Chapman, Jr. ...... G07F 17/3244 705/14.12
2015/0363862 A1 12/2015 Ranft et al.
2016/0012410 A1 * 1/2016 Hanson ................ G06Q 20/405 705/35
2016/0014553 A1 * 1/2016 Cardinal ................. H04W 4/02 455/456.3
2016/0050316 A1 2/2016 Jain et al.
2016/0125036 A1 5/2016 Hanson et al.
2017/0132706 A1 5/2017 Kariv et al.
2017/0148081 A1 * 5/2017 Chauhan ............ G06Q 30/0631
2017/0169497 A1 * 6/2017 Lee .................... G06Q 30/0631
2017/0236173 A1 * 8/2017 Mason ................... G06Q 50/01 705/313
2017/0243436 A1 * 8/2017 George ............... G07F 17/3211

* cited by examiner

GAMING SYSTEM FOR RECOMMENDING FINANCIAL PRODUCTS BASED UPON GAMING ACTIVITY

CROSS REFERENCE TO RELATED APPLICATIONS

The application is a continuation of U.S. patent application Ser. No. 15/473,736 filed on Mar. 30, 2017, which claims priority to U.S. Provisional Patent Application No. 62/381,637 filed Aug. 31, 2016, each of which is incorporated by reference herein in its entirety.

FIELD OF THE INVENTION

The invention relates to methods and systems for analyzing electronic game playing activity.

BRIEF SUMMARY OF THE INVENTION

Some exemplary embodiments of the invention relate to a sales lead generation system. Such embodiments include a gaming device and an application server. The application server includes a game controlling module configured to receive game play data associated with one or both of (i) actions of an end user selecting an electronic game for game play and (ii) actions of the end user playing an electronic game. The application server further includes an education module configured to display on the gaming device, while the end user is playing the electronic game, educational information regarding one or more financial products; and receive data indicating that the end user has reviewed the educational information or answered a question regarding the educational information. The application server further includes a loyalty module configured to award the end user consumer reward points based on receiving the data indicating that the end user has reviewed the educational information or answered the question regarding the educational information. The system further includes a social media server configured to transmit social media data associated with the end user to the application server. Still further, the system includes a biofeedback device configured to collect biofeedback data associated with the end user and transmit the biofeedback data to the application server. The application server further includes a correlation module configured to identify one or more financial products based on, at least, the received game play data, the received social media data and the received biofeedback data. A display and input device is configured to display to the end user data describing the one or more financial products; receive input describing an indication of interest of the end user regarding one or more of the one or more financial products; transmit data describing a location of the end user to the application server. An agent/advisor server is further configured to identify a sales entity at the location that sells at least one of the one or more financial products indicated by the end user to be of interest. A client calendar server is configured to assist in scheduling a communication event between the sales entity and the end user.

The invention is directed to a system and method for analyzing electronic gaming activity. Game play data associated with one or both of (i) actions of an end user selecting an electronic game for game play and (ii) actions of the end user playing an electronic game is received. While the end user is playing the electronic game, educational information regarding one or more financial products is displayed to the end user. Data indicating that the end user has reviewed the educational information or answered a question regarding the educational information is received. Based on the data indicating that the end user has reviewed the educational information or answered the question regarding the educational information, the end user consumer is rewarded points. Biofeedback data and social media data associated with the end user is received. Based on, at least, the received game play data, the received social media data and the received biofeedback data, one or more financial products are identified. Data describing the one or more financial products is displayed to the end user. An indication of interest regarding one or more of the one or more financial products is received from the end user. A location of the end user is determined. A sales entity at the location that sells at least one of the one or more financial products indicated by the end user to be of interest is identified. A communication event between the sales entity and the end user is established.

In some embodiments, the financial product comprises an insurance product. In other embodiments, the financial product comprises an investment product. In still other embodiments, the communication event comprises a telephonic or in-person meeting scheduled between the sales entity and the end user.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE EXEMPLARY EMBODIMENTS

Figure 1:
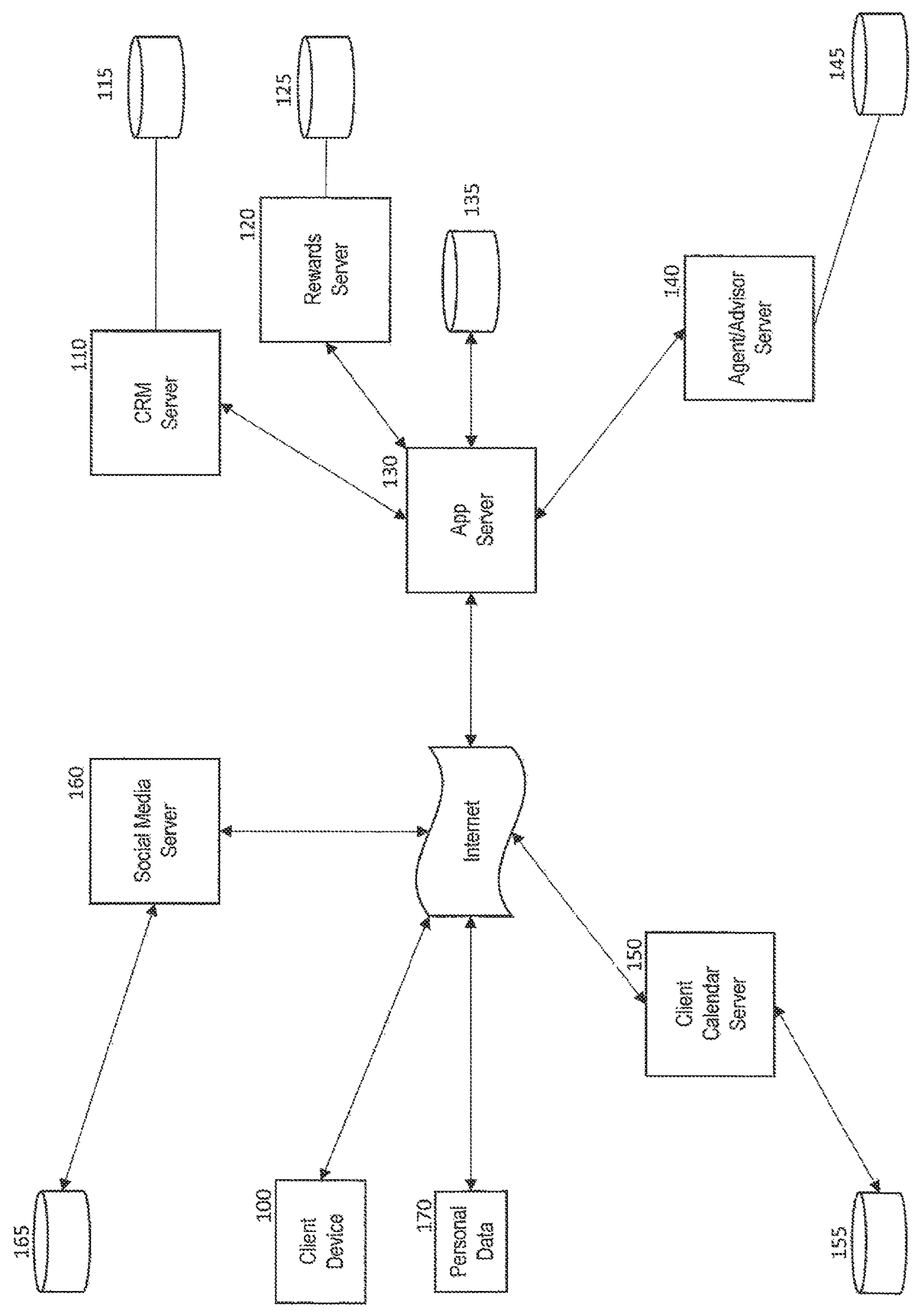
FIG. 1 illustrates an exemplary system and communication flow in connection with an embodiment of the present invention.

The present invention involves improved computer systems and methods that use electronic games to educate consumers on insurance and financial services, identify potential needs or interests of the consumer based on the consumer's game decisions and play, and generate sale leads/opportunities that involve offering products/services to meet the identified needs and interests of the consumer. The games may relate to, e.g., sports, simulated life/family/career, or logic. Other types of games may be implemented within the scope of the present invention.

More specifically, decisions, movements and/or actions of the end user playing the game can be identified and tracked. Such activities, and/or the end user's choice of game or other game-related choices, may be evaluated and a correlation may be made to products/services offered by a financial institution (e.g., insurance or financial products) that may be needed and/or desired by the end user. For example, the end user's movements/actions made during game play may be reflective of the end user's real life mindsets, behaviors, adversity to risk, and personality. Such insights regarding the end user may be used to recommend products that may be of interest to the end user, discounts that may be available to the end user, and/or rating the end user for various insurance or financial products.

The system may gather data pertaining to an end user (i.e., thereby allowing the system to make product recommendations, offer discounts and/or perform rating of the end user) in a variety of different ways. In choosing to play the game, the end user agrees to allow the financial services company, or an agent or advisor, contact the end user, over-riding any previous "do not contact" directions associated with the end user. The end user may also give permission to the system to access the end user's calendar.

In one embodiment, each game type presents the user with multiple avatar options, the selection of which may be indicative of an interest or characteristic of the user. For example, one avatar option may be a farmer. If the end user chooses the farmer avatar option, the application may infer that the end user owns a farm and, thus, farm-related insurance coverage may be of interest. Another avatar option may be a young adult. If the end user chooses this avatar option, the application may infer that the end user is a young adult and may not own a house or have children and, thus, home owners insurance and/or life insurance may not be of interest to the end user, but auto insurance likely is of interest.

In another embodiment, the game, or path within a game, chosen by the user is interpreted in order to make product correlations. For example, one game, or path within a game, may include themes or information related to investment products. If the end user chooses that game, or path within the game, the system may infer that the end user is interested in investment products and make recommendations, or take other actions with regard to the end user, accordingly. In another example, one game, or path within a game, may include themes or information related to property and casualty insurance/financial products. If the end user choses that game, or path within the game, the system may infer that the end user is interested in property and casualty insurance/financial products and make recommendations, or take other actions with regard to the end user, accordingly.

In other embodiments, the game presents the end user with various options and questions during the game. The end user's selections and responses are analyzed by the system to make inferences as to the needs and desires of the end user as it relates to insurance and financial products.

In correlating the data received from the end user's game choices, selections and play to insurance and financial products, the system also relies on data it may have regarding the end user from other sources. For example, the end user may already be a customer of the company hosting/affiliated with the system, in which case the system will have demographic data regarding the end user, information about products the end user currently has or in which the end user has shown interest, and/or claims data regarding the end user.

In some embodiments, end users may contribute personal data (e.g., through a social media account) and/or biofeedback data (e.g., through a health-related application that receives biofeedback data from the end user wearing a bio-monitoring device) to the system. Such data may also be used in connection with making a product recommendation for the end user. For example, such data may include the end user's gender, name, and age, which would be useful in making product recommendations for the end user.

The systems and methods described herein may be used to educate the end user. For example, during the game play, the end user may learn about insurance and/or financial products/services. More particularly, the system may interrupt game play with pop-up messages specific to insurance and/or financial products/services at certain locations or occurrences of certain events or actions. The messages presented by the system may correspond in some fashion to the type of game selected by the user and/or the user's in-game actions/choices. For example, if the user selects an auto racing game, the game may present messages regarding auto and life insurance, indicating how slower acceleration and deceleration can increase a telematics-based discount. Reward points may be awarded for review of messages, as described below.

In order to ensure that the system has enough data regarding the end user's game choices, selections and play to make meaningful correlations, the game may incentivize the user for further game play. More particularly, in some embodiments, the end user can be incentivized to make certain movements/take certain actions in the game and to encourage further game play and/or receive further education by the end user. Such incentives can take the form of consumer rewards/loyalty points.

With sufficient user data acquired to perform analyses, big data correlations, and product/service identification, the game presents the user with options of advanced levels of game play that are based on determinations made from the previously acquired and analyzed data. In these advanced levels of play, the user can continue to earn points and the game can continue to collect user and game play data for further analysis. With the end user's selection of the advanced game level, the system correlates the end user's selections and game play data with member data and other big data sources to identify insurance or financial products/services that may be of interest to the user, thereby translating the user's virtual data into real life options (products/services) that may be of benefit to the user. Upon identifying the relevant products/services, the game initiates the lead generation process described more fully herein.

At the end of a stage/level of a game, or at the end of a game, the system may activate an associated application on the user's device to cause a new window to display on the user interface, through which the application presents to the user the number of points earned during that play period and the user's current total program points. Additionally, the application may generate and transmit a request to other loyalty program participating companies (if any) for exemplary products available at no cost or a reduced cost to the user with redemption of user's point totals and present those products in the same window on the user interface. The application may further present the option to the user to complete a purchase/points redemption transaction for a presented product via a link integrated into/with the products.

Also at end of stage/level or end of game, the system may activate an associated application on the end user's device to cause a new window to display on the user interface, presenting a product/service-specific webpage (based on user's game play) where the user can learn or request additional information on the recommended products. The system may also determine the end user's location (e.g., the IP address of the device used by the end user to play the game) and identify agents and advisors in the vicinity and determine if they are licensed to sell the products that have been recommended to the end user. The system may also access the calendars of those agents/advisors in the user's vicinity and licensed for the relevant products to determine times of agent/advisor availability. Callback times may be proposed to the end user and/or the end user's calendar may be accessed to assist in coordinating and setting an appointment for the end user and agent/advisor. In some embodiments, rather than scheduling a call between the user and the agent/advisor, the scheduling application's message presented in the user's user interface may allow the user to request an immediate call or to not designate any specific time for the call. Here, the scheduling application generates and transmits an outbound call entry to the insurance company's customer service center system so that instruction to initiate a call to the user is placed immediately in the queue of a representative knowledgeable of the product/service of interest to the user.

The effectiveness of the methodology can be determined by measuring product sales trends deriving from the generated sale leads/product recommendations and by evaluating the accuracy of the correlations to of the end user's game playing actions to his real life behaviors.

An exemplary computer architecture and associated process flow for aspects of the present invention are now described with reference to FIG. 1.

Application server 130 may comprise a series of modules, programmed to carry out the functionality described herein, including, for example, a game controlling module, an education module, a loyalty module, and a correlation module.

Application server 130 hosts files related to game, the game content, and the website that hosts the game for access by an end user employing client device 100 (e.g., a gaming device, such as a CPU, laptop, tablet, or phone). Upon an end user request to go to the game webpage, the client browser makes a call to the application server 130, which directs the browser to the website hosting the game. The application server 130 sends the game files (e.g., HTML, java script) back to client device 100. Client device 100 directs data indicative of end user's game play and answers to questions incorporated into game play back to the application server 130. In one embodiment, the game files are coded so that the client device 100 automatically transmits certain data/actions to the application server 130 (e.g., user responses to questions presented in game play). Application server 130 analyzes the data related to the end user's selections, choices and game play and correlates that data to products (e.g., financial or insurance products/services) that may be of interest to the client. Those product proposals are sent back to client device 100 and displayed for review by the end user. Application server database 135 may be used to store information relating to the end user, the game(s) and the end user's playing of the game(s).

Application server 130 recognizes each continuous game play period as a session and assigns a key to each session for data tracking purposes. Such tracking information may also be stored in application server database 135.

In the event loyalty points are presented and awarded during game play, application server 130 communicates with rewards server 120 to determine information about the end user's loyalty account, present appropriate points to offer to the end user, and store points awarded during game play for future redemption, in rewards server database 125.

In the event the end user is already a customer of the company hosting/affiliated with the game, application server 130 may access CRM server 110 and associated database 115 to obtain personal data about the end user. This will allow application server 130 to make more accurate and comprehensive product recommendations to the end user.

If the end user consents to have application server 130 access the end user's social media account(s), application server 130 will obtain data regarding the same from social media server 160, and associated database 165.

If the end user choses to provide biometric data to application server 130, the same can be accomplished by uploading such data from personal data server 170. Such personal data may have been collected by the end user employing a biofeedback device 175, e.g., a wearable device.

The client device 100 may also display options for the end user to request more information about the product recommendations and/or to be contacted by the insurance company, or an agent/advisor. Upon selecting an option, data regarding the same is transmitted to application server 130 for further action. Application server 130 recognizes the end user's request for more information. In some instances, the application server 130 may send the end user with further information as desired (e.g., a web page with information or link to a web page containing information). In other instances, the application server 130 may determine the end user's location, e.g., using the IP address associated with client device 100 or by requesting it directly from the user. Application server 130 accesses agent/advisor server 140 and associated database 145 (e.g., which maintains data regarding territory management) to identify agents/advisors near the location and licensed to sell the relevant products and transmits data regarding the determined agent/advisor to client device 100.

Client device 100 displays agent/advisor data and present the end user with option to schedule appointment with agent/advisor and to grant application server 130 with access to the end user's calendar (e.g., maintained on client calendar server 150 and associated database 155). Client device 100 transmits selected scheduling option to application server 130 and grants access to the end users calendar.

Application server 130 accesses the end user's calendar through calendar server 150 and the calendar of the agent/advisor through agent/advisor server 150 and determines potential meeting times and locations and returns the potential meeting options to client device 100. Client device 100 presents the meeting options to the end user and, upon receiving a selection, transmits its selection to application server 130. The meeting time and location are recorded in the end user's calendar via client calendar server 150 by application server 130. Application server 130 also accesses the agent/advisor calendar via agent/advisor server 140 and enters the selected meeting time/location.

In some embodiments, the methods are carried out by a system that employs a client/server architecture such as, for example, the collection of components illustrated and described with reference to FIG. 1. Such exemplary embodiments are described as follows with reference to FIG. 2. The data that may be used as an input to the system, and the outputs from the system, may be stored in one or more databases 201 (e.g., application server database 135; CRM server database 115; rewards server database 125; agent/advisor server database 145; client calendar server database 155; social media database 165). Database server(s) 202 may include a database services management application 203 that manages storage and retrieval of data from the database(s) 201. The databases 201 may be relational databases; however, other data organizational structures may be used without departing from the scope of the present invention.

One or more application server(s) 204 (e.g., application server 130) are in communication with the database server 202. The application server 204 communicates requests for data to the database server 202 (e.g., in some instances through another application server such as CRM server 110, rewards server 120, agent/advisor server 140). The database server 202 retrieves the requested data. The application server 204 may also send data to the database server 202 for storage in the database(s) 201. The application server 204 comprises one or more processors 205, non-transitory computer readable storage media 207 that store programs (computer readable instructions) for execution by the processor(s), and an interface 206 between the processor(s) 205 and computer readable storage media 207. The application server 204 may store the computer programs referred to herein.

Figure 2:
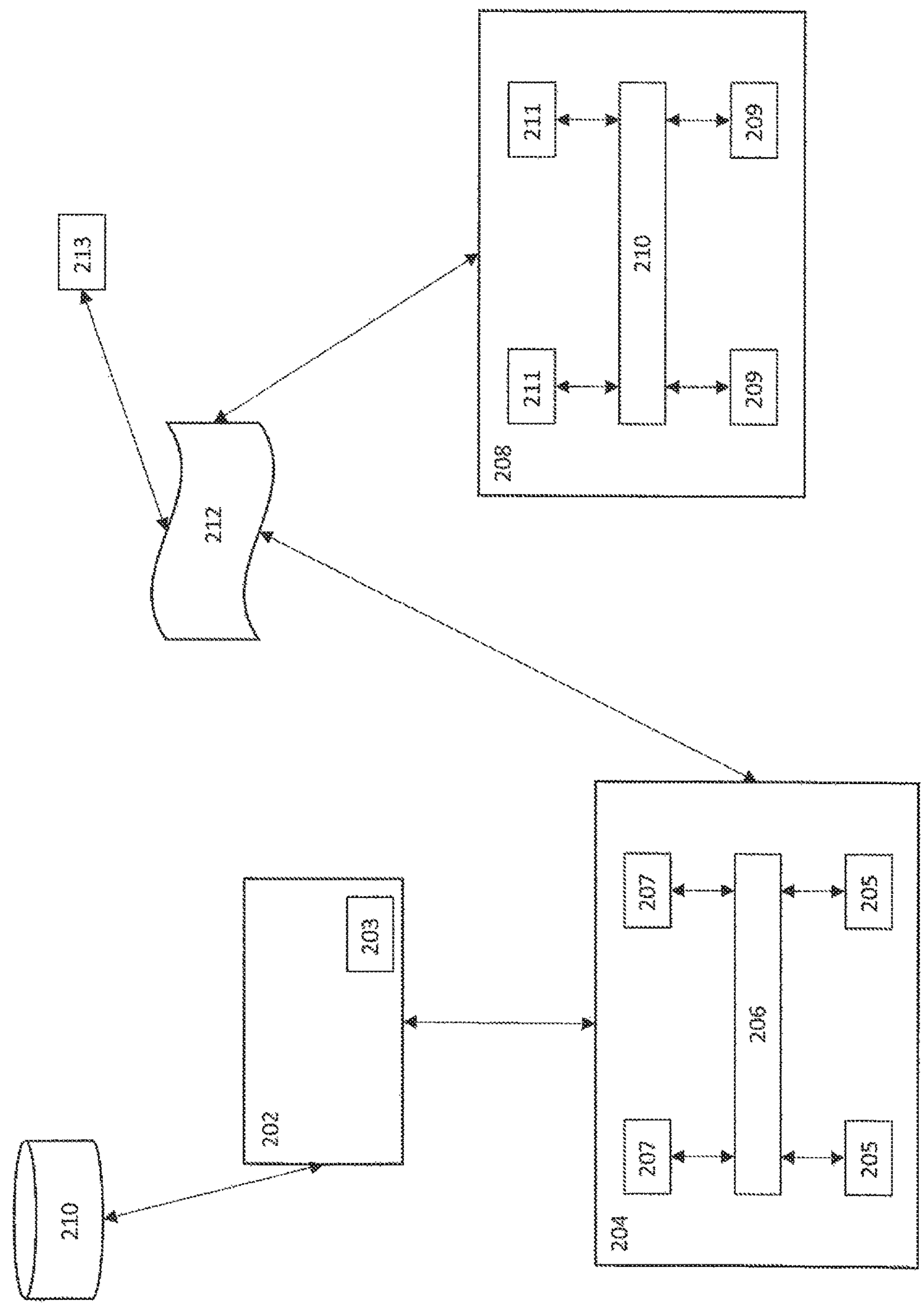
FIG. 2 illustrates exemplary computer components that may be used to carry out embodiments of the present invention.

To the extent data and information is communicated over a network (e.g., the Internet or an Intranet), one or more network servers 208 may be employed (not shown in FIG. 1, but would sit between the Internet and application server 130). The network server 208 also comprises one or more processors 209, computer readable storage media 211 that store programs (computer readable instructions) for execution by the processor(s), and an interface 210 between the processor(s) 209 and computer readable storage media 211. The network server 208 is employed to deliver content that can be accessed through the communications network 212, e.g., by an end user employing computing device 213. When data is requested through an application, such as an Internet browser, the network server 208 receives and processes the request. The network server 208 sends the data or application requested along with user interface instructions for displaying a user interface on device 213 (e.g., client device 100).

The computers referenced herein are specially programmed to perform the functionality described herein.

The non-transitory computer readable storage media (e.g., 207 or 211) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

Figure 3:
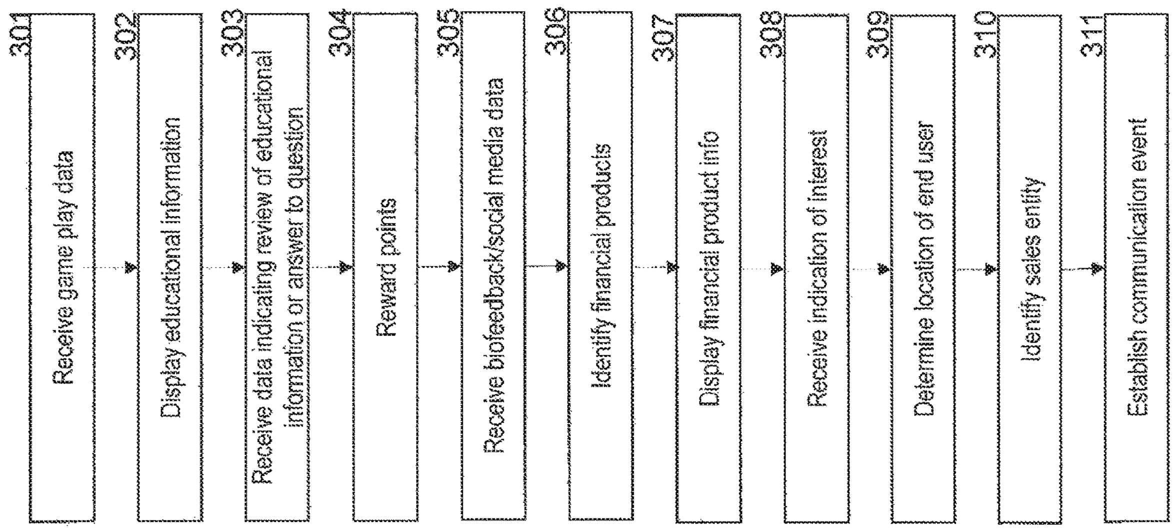
FIG. 3 illustrates an exemplary method of the present invention.

With reference to FIG. 3, a flow chart illustrating an exemplary method of the present invention is shown. Game play data associated with one or both of (i) actions of an end user selecting an electronic game for game play and (ii) actions of the end user playing an electronic game is received, in step 301. While the end user is playing the electronic game, educational information regarding one or more financial products is displayed to the end user, in step 302. Data indicating that the end user has reviewed the educational information or answered a question regarding the educational information is received, in step 303. Based on the data indicating that the end user has reviewed the educational information or answered the question regarding the educational information, the end user consumer is rewarded points, in step 304. Biofeedback data and social media data associated with the end user is received, in step 305. Based on, at least, the received game play data, the received social media data and the received biofeedback data, one or more financial products are identified, in step 306. Data describing the one or more financial products is displayed to the end user, in step 307. An indication of interest regarding one or more of the one or more financial products is received from the end user, in step 308. A location of the end user is determined, in step 309. A sales entity at the location that sells at least one of the one or more financial products indicated by the end user to be of interest is identified, in step 310. A communication event between the sales entity and the end user is established, in step 311.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A gaming system for generating and analyzing gaming data comprising:

- a gaming device for displaying an electronic game, the gaming device receiving a plurality of gaming inputs from an end user interacting with the electronic game; and
- an application server coupled to the gaming device, the application server comprising:
  - a game module configured to receive game play data associated with the plurality of gaming inputs from the end user interacting with the electronic game displayed on the gaming device;
  - an education module configured to cause the gaming device to display educational information regarding one or more financial product categories as part of the electronic game,
  - a loyalty module configured to store and award reward points to the end user based on the loyalty module receiving game play data indicating that the end user has interacted with the educational information;
- the application server configured to identify one or more targeted financial product categories based on the received game play data;
- an input device having a display and configured to display as part of the electronic game, to the end user, data associated with the one or more targeted financial product categories, and an end user interface configured to receive from the end user a first input and a second input related to one or more of the one or more targeted financial product categories; and an advisor server configured to identify a seller of one or more financial products associated with the one or more targeted financial product categories based on the first input and a location associated with the end user related to the first input and to generate a communication session between the seller and the end user, wherein the input device is configured to receive the second input after the communication between the seller and the end user is generated, the second input being indicative of an approval of a purchase by the end user of the one or more financial products from the seller and the purchase requiring at least a portion of the reward points.

2. The gaming system of claim 1 further comprising:

a client calendar server configured to assist in scheduling a communication event between a sales entity and the end user.

3. The gaming system of claim 2 wherein the communication event comprises a telephonic or in-person meeting scheduled between the sales entity and the end user.

4. The gaming system of claim 2, wherein the client calendar server is configured to access a calendar associated with the sales entity.

5. The gaming system of claim 2, wherein the client calendar sever is configured to allow the end user to request an immediate call with the sales entity.

6. The gaming system of claim 1 further comprising:

a biofeedback device configured to collect biofeedback data associated with the end user and transmitting the biofeedback data to the application server.

7. The gaming system of claim 1, wherein the gaming device and the display device are the same device.

8. The gaming system of claim 1, wherein the one or more financial product categories includes an insurance product category.

9. The gaming system of claim 1, wherein the one or more financial product categories includes an investment product category.

10. The gaming system of claim 1, wherein the display device determines the location associated with the end user based on an IP address of the display device associated with the end user.

11. The gaming system of claim 1, wherein the second input comprises selecting a link on the end user interface.

* * * * *